(12) United States Patent
Noguchi

(10) Patent No.: US 7,623,151 B2
(45) Date of Patent: *Nov. 24, 2009

(54) VIBRATION CORRECTING DEVICE, LENS BARREL, AND OPTICAL DEVICE

(75) Inventor: Kazuhiro Noguchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

This patent is subject to a terminal disclaimer.

(21) Appl. No.: 11/175,135

(22) Filed: Jul. 7, 2005

(65) Prior Publication Data

US 2005/0254806 A1    Nov. 17, 2005

Related U.S. Application Data

(62) Division of application No. 10/021,045, filed on Dec. 19, 2001, now Pat. No. 6,985,176.

(30) Foreign Application Priority Data

Dec. 25, 2000  (JP)  ............... 393563/2000

(51) Int. Cl.
    *H04N 5/228* (2006.01)
(52) U.S. Cl. ............... 348/208.11; 348/208.7; 396/55
(58) Field of Classification Search ............ 348/208.99, 348/208.1, 208.2, 208.3, 208.4, 208.5, 208.11, 348/208.12, 345, 340, 335, 208.6, 208.7, 348/208.8; 396/52, 53, 54, 55
    See application file for complete search history.

(56) References Cited

U.S. PATENT DOCUMENTS

| 5,117,246 | A | 5/1992 | Takahashi et al. | |
|---|---|---|---|---|
| 5,602,675 | A | 2/1997 | Okada | |
| 5,689,369 | A | 11/1997 | Noguchi | |
| 5,761,546 | A | 6/1998 | Imada | 396/55 |
| 5,845,157 | A | 12/1998 | Imura et al. | 396/55 |
| 5,847,887 | A | * 12/1998 | Ogura et al. | 359/822 |
| 5,932,984 | A | 8/1999 | Murakami et al. | |
| 5,973,319 | A | 10/1999 | Washisu | 250/231.13 |
| 5,974,270 | A | 10/1999 | Imura et al. | 396/55 |
| 6,035,134 | A | 3/2000 | Sato et al. | 396/55 |

(Continued)

FOREIGN PATENT DOCUMENTS

JP    6-289465    10/1994

(Continued)

*Primary Examiner*—Lin Ye
*Assistant Examiner*—Nelson D. Hernández Hernández
(74) *Attorney, Agent, or Firm*—Fitzpatrick, Cella, Harper & Scinto

(57) ABSTRACT

An optical device with an imaging device for forming an image of a subject with a lens device includes a lens unit, a movable member making the lens unit movable within a plane orthogonal to the optical axis of the lens unit, an image pickup device imaging the subject image formed by the lens device, a fixed member limiting the movement of the movable member in the optical axis direction, at least three balls rolling between the movable and fixed member, a vibration detecting unit, and pitch and yaw direction drive units for driving the movable member in the pitch and yaw directions within the optical axis orthogonal plane, respectively. The pitch and yaw direction drive units press the movable member toward the fixed member side by means of magnetic pressing forces caused by magnetic attractive action between drive magnets and yokes.

9 Claims, 9 Drawing Sheets

U.S. PATENT DOCUMENTS

| | | |
|---|---|---|
| 6,064,827 A | 5/2000 | Toyoda |
| 6,091,900 A | 7/2000 | Kaneda et al. ................. 396/55 |
| 6,112,028 A | 8/2000 | Okada |
| 6,122,102 A | 9/2000 | Gehris et al. ................. 359/429 |
| 6,295,412 B1 | 9/2001 | Katano et al. ................. 396/55 |
| 6,374,048 B1 | 4/2002 | Uenaka et al. ................. 396/55 |
| 6,400,902 B1 | 6/2002 | Usui ........................... 396/55 |
| 6,631,042 B2 | 10/2003 | Noguchi ..................... 359/823 |
| 2002/0163581 A1 | 11/2002 | Kitazawa et al. ......... 348/208.6 |
| 2004/0201707 A1 | 10/2004 | Noguchi et al. .......... 348/208.7 |

FOREIGN PATENT DOCUMENTS

| | | |
|---|---|---|
| JP | 10-319465 | 12/1998 |
| JP | 11-305277 | 11/1999 |

* cited by examiner

VIBRATION CORRECTING DEVICE, LENS BARREL, AND OPTICAL DEVICE

CROSS-REFERENCE TO RELATED APPLICATION

This application is a divisional application of application Ser. No. 10/021,045 filed Dec. 19, 2001, pending.

BACKGROUND OF THE INVENTION

1. Field of the Invention

The present invention relates to an image vibration correcting device for shifting a lens within an optical axis orthogonal plane to correct image vibration due to so-called hand movements, and for example, a vibration correcting device suitable for being installed in a lens barrel, or a imaging device such as a video camera, digital still camera or the like, or an observation device such as binoculars, astronomical telescope or the like.

2. Description of the Related Art

In order to prevent image vibration due to hand movements or the like which is easily caused when shooting in a handheld condition, various devices have been proposed for realizing vibration correction by detecting vibration information of a camera or binoculars and optically canceling the vibration based on the detection results.

For example, in U.S. Pat. No. 6,112,028 (Japanese Laid-Open No. 305277 of 1999), a so-called shift-method vibration correcting device is proposed in which a vibration correcting lens group among a plurality of lens groups is shifted in an optical axis orthogonal plane to correct vibration.

In a vibration correcting device relating to this proposition, three pins are radially press-fitted to a shift member holding the vibration correcting lens group, and engaged into slots formed at three portions in the circumferential direction of a fixed member which is the device main body while leaving a space, and guided so that the vibration correcting lens group can be shifted within the optical axis orthogonal plane.

In this vibration correcting device, the pins are pressed toward one side in the optical axis direction in the slots by using magnetic attraction acting between a magnet and a ferromagnet, whereby looseness inside this guide portion and tilt of the vibration correcting lens group due to the looseness are prevented. Thereby, optical performance is maintained and operation noise caused by looseness at the guide portion when driving is reduced.

In the vibration correcting device disclosed in U.S. Pat. No. 5,602,675 (Japanese Laid-Open No. 289465 of 1994), in a flexible substrate connecting a circuit board provided in the fixed member and a coil provided at the shift member, by contrivance in the shape and arrangement of an extended portion to reduce loads in the optical axis direction and shift two directions, harmful influences to the drive of the shift member are prevented.

Furthermore, in the vibration correcting device disclosed in U.S. Pat. No. 6,064,827 (Japanese Laid-Open No. 319465 of 1998), the objects to eliminate looseness between the fixed member and the shift member in the optical axis direction and reduce drive resistance of the shift member against the fixed member are achieved by disposing a rolling ball between the fixed member and the shift member and pressing the shift member is prevented by a spring pressing force against the fixed member via the ball.

In this vibration correcting device, a structure has been employed in which the shift member is guided in the shift direction by the ball rolling, and the shift member's prevented from rotating about the optical axis by a spring.

Recently, in imaging devices and observation devices to which lens barrels are mounted, in order to improve portability and containing performance, a downsized design or a design with fewer projections has been demanded, and in accordance with this tendency, downsizing is also required for lens barrels and vibration correcting devices.

However, if a lens barrel is downsized, a space for locating a vibration correcting device main body or a flexible substrate connecting the fixed member and shift member is remarkably limited, and as a result, it becomes difficult to sufficiently lower the rigidity of the flexible substrate. Therefore, in U.S. Pat. No. 5,602,675, it is difficult to lower an elastic force in the optical axis direction to be generated on the flexible substrate to a permissible level by only contrivance in the shape and arrangement of the flexible substrate.

Therefore, in U.S. Pat. No. 6,112,028, even if the shift member is pressed in the optical axis direction by a proper force while using a magnetic attractive force, due to unevenness in the elastic force in the optical axis direction of the flexible substrate, the pins of the shift member are excessively pressed into the slots and resistance greatly increases, or to the contrary, pressing by means of the magnetic attractive force is canceled, and this harmfully influences the drive of the shift member.

On the other hand, in the field of image pickup devices such as a CCD or the like for converting a subject image formed on a focus plane by a shooting optical system into an electric signal, in accordance with advanced semiconductor fine processing techniques, manufacturing of an imaging device with smaller pixel pitches has become possible.

Accordingly, two mainstreams have been developed, that is, further downsizing of optical systems by forming an equivalent number of pixels to that of a conventional art within a smaller area, and a further increase in resolution of optical systems accompanied with an increase in the number of pixels within the same pixel area or due to pixel area expansion.

In the former case, since the shift amount of the vibration correcting lens group for correcting the same amount of vibration is roughly in proportion to the imaging area, more minute movement is required, and the location space for the flexible substrate also becomes smaller.

In the latter case, resolution may deteriorate unless correction of minute vibration is possible, so that minute movement of the shift member must be made possible by lowering the frictional force generated at the guide portion.

In all cases, higher accuracy relative to the tilt of the vibration correcting lens group is required.

Furthermore, in the vibration correcting device disclosed in U.S. Pat. No. 6,064,827, the ball is held by a holding member so as not to change in position with respect to the fixed member, the ball and shift member are guided by means of rolling. However, since the ball rolls at the position at which the ball is held by the holding member, sliding frictional forces are generated between the ball and fixed member and between the ball and shift member.

Therefore, the pressing force of a spring for eliminating looseness is limited to be at a minimum level required for holding the ball, so that the shift member separates from the ball due to slight acceleration in the optical axis direction resulting from an inertial force exceeding this pressing force applied to the shift member, and the deterioration in optical performance due to tilt of the vibration correcting lens group and noise such as a ball striking sound becomes a problem.

For example, when a shift member with a 4 g weight is pressed by a 4 gf force, application of only 1 G or more of acceleration causes the shift member to separate from the ball.

The prevention of rotation of the shift member about the optical axis by means of a spring relies on the pulling force of the spring, so that the rotation cannot be completely stopped, and the force can only suppress the rotation.

Particularly, in the construction of the means for detecting the position of the shift member which is disclosed in the abovementioned U.S. Pat. No. 6,064,827, an output value of the position detecting means changes due to the rotation about the optical axis. Therefore, depending on the positional relationship between the force generating position at which the drive means generates a shifting drive force and the center of gravity of the shift member, or the connected position and shape of the flexible substrate connected to a coil on the shift member, the shift member rotates about the optical axis in accordance with the shifting drive, and the drive of the vibration correcting lens group to a correct position for vibration correction becomes impossible.

SUMMARY OF THE INVENTION

The object of the invention is, therefore, to provide a vibration correcting device wherein noise such as a striking sounds does not occur at a guide portion by holding and guiding a shift member without looseness, the tilt of a vibration correcting lens group is very small, optical performance is excellent, a pressing force to be applied to the shift member can be increased by reducing a drive frictional force when correcting vibration by means of a ball rolling guide, and influences of the elastic force in the optical axis direction of a flexible substrate can be prevented.

In order to achieve the abovementioned object, a vibration correcting device of the invention comprises:

a lens unit having an optical axis;

a movable member holding the lens unit, which makes the lens unit movable within a plane orthogonal to the optical axis;

a fixed member for limiting the movement of the movable member in the optical axis direction;

at least three balls disposed between the movable member and fixed member, which can roll between the movable member and fixed member, and make relative movements of the movable member and fixed member possible;

a vibration detecting unit for detecting vibration, which outputs vibration information corresponding to vibration; and a drive unit for driving the movable member within the optical axis orthogonal plane in response to the vibration information from the vibration detecting unit, where the drive unit includes at least a drive magnet held by the fixed member and a yoke and a coil held by the movable member, or the drive unit includes at least a drive magnet held by the movable member and a yoke and a coil held by the fixed member, wherein the drive unit presses the movable member toward the fixed member side by means of a magnetic pressing force due to magnetic attractive action between the drive magnet and yoke.

Furthermore, a vibration correcting device of the invention comprises:

a lens unit having an optical axis direction;

a movable member holding the lens unit, which makes the lens unit movable within a plane orthogonal to the optical axis;

a fixed member for limiting the movement of the movable member in the optical axis;

at least three balls disposed between the movable member and fixed member, which can roll between the movable member and fixed member and make relative movements of the movable member and fixed member possible;

a vibration detecting unit for detecting vibration, which outputs vibration information corresponding to vibration;

a pitch direction drive unit for driving the movable member in the pitch direction within the optical axis orthogonal plane and a yaw direction drive unit for driving the movable member in the yaw direction within the optical axis orthogonal plane in accordance with the vibration information from the vibration detecting unit, where the pitch direction drive unit and yaw direction drive unit include drive magnets held by the fixed member and yokes and coils held by the movable member, or include drive magnets held by the movable member and yokes and coils held by the fixed member, wherein the pitch direction drive unit and yaw direction drive unit press the movable member toward the fixed member side by means of magnetic pressing forces due to magnetic attractive action between the drive magnets and yokes.

Furthermore, a vibration correcting device of the invention comprises:

a lens unit having an optical axis direction;

a movable member holding the lens unit, which makes the lens unit movable within a plane orthogonal to the optical axis;

a fixed member for limiting the movement of the movable member in the optical axis;

at least three balls disposed between the movable member and fixed member, which can roll between the movable member and fixed member and make relative movements of the movable member and fixed member possible;

a vibration detecting unit for detecting vibration, which outputs vibration information corresponding to vibration;

a pitch direction drive unit for driving the movable member in the pitch direction within the optical axis orthogonal plane and a yaw direction drive unit for driving the movable member in the yaw direction within the optical axis orthogonal plane in accordance with the vibration information from the vibration detecting unit, where the pitch direction drive unit and yaw direction drive unit include drive magnets held by the fixed member and yokes and coils held by the movable member, or include drive magnets held by the movable member and yokes and coils held by the fixed member;

a pitch directional position detecting unit for detecting the moving position of the movable member in the pitch direction and a yaw directional position detecting unit for detecting the moving position of the movable member in the yaw direction, where the pitch detecting directional axis of the pitch directional position detecting unit and the yaw detecting directional axis of the yaw directional position detecting unit are substantially on and along the optical axis of the lens unit when the movable member is at a neutral position in the pitch direction and yaw direction, wherein the pitch direction drive unit and yaw direction drive unit press the movable member toward the fixed member side by means of magnetic pressing forces due to magnetic attractive action between the drive magnets and yokes.

Furthermore, a lens device of the invention comprises:

a lens unit which is disposed inside the lens device and has an optical axis;

a movable member holding the lens unit, which makes the lens unit movable within a plane orthogonal to the optical axis;

a fixed member for limiting the movement of the movable member in the optical axis direction;

at least three balls disposed between the movable member and fixed member, which can roll between the movable member and fixed member and make relative movements of the movable member and fixed member possible;

a vibration detecting unit for detecting vibration, which outputs vibration information corresponding to vibration;

a drive unit for driving the movable member within the optical axis orthogonal plane in accordance with the vibration information from the vibration detecting unit, where the drive unit includes at least a drive magnet held by the fixed member and a yoke and a coil held by the movable member, or includes at lease a drive magnet held by the movable member and a yoke and a coil held by the fixed member, wherein the drive unit presses the movable member toward the fixed member side by means of a magnetic pressing force due to magnetic attractive action between the drive magnet and yoke.

Furthermore, a lens device of the invention comprises:

a lens unit which is disposed inside the lens device and has an optical axis;

a movable member holding the lens unit, which makes the lens unit movable within a plane orthogonal to the optical axis;

a fixed member for limiting the movement of the movable member in the optical axis direction;

at least three balls disposed between the movable member and fixed member, which can roll between the movable member and fixed member and make relative movements of the movable member and fixed member possible;

a vibration detecting unit for detecting vibration, which outputs vibration information corresponding to vibration;

a pitch direction drive unit for driving the movable member in the pitch direction within the optical axis orthogonal plane and a yaw direction drive unit for driving the movable member in the yaw direction within the optical axis orthogonal plane in accordance with the vibration information from the vibration detecting unit, where the pitch direction drive unit and yaw direction drive unit include drive magnets held by the fixed member and yokes and coils held by the movable member, or include drive magnets held by the movable member and yokes and coils held by the fixed member, wherein the pitch direction drive unit and yaw direction drive unit press the movable member toward the fixed member side by means of magnetic pressing forces due to magnetic attractive action between the drive magnets and yokes.

Furthermore, a lens device of the invention comprises:

a lens unit which is disposed inside the lens device and has an optical axis;

a movable member holding the lens unit, which makes said lens unit movable within a plane orthogonal to the optical axis;

a fixed member for limiting the movement of the movable member in the optical axis direction;

at least three balls disposed between the movable member and fixed member, which can roll between the movable member and fixed member and make relative movements of the movable member and fixed member possible;

a vibration detecting unit for detecting vibration, which outputs vibration information corresponding to vibration;

a pitch direction drive unit for driving the movable member in the pitch direction within the optical axis orthogonal plane and a yaw direction drive unit for driving the movable member in the yaw direction within the optical axis orthogonal plane in accordance with the vibration information from the vibration detecting unit, where the pitch direction drive unit and yaw direction drive unit include drive magnets held by the fixed member and yokes and coils held by the movable member, or include drive magnets held by the movable member and yokes and coils held by the fixed member;

a pitch directional position detecting unit for detecting the moving position of the movable member in the pitch direction and a yaw directional position detecting unit for detecting the moving position of the movable member in the yaw direction, where the pitch detecting directional axis of the pitch directional position detecting unit and the yaw detecting directional axis of the yaw directional position detecting unit are substantially on and along the optical axis of the lens unit when the movable member is at a neutral position in the pitch direction and yaw direction, wherein the pitch direction drive unit and yaw direction drive unit press the movable member toward the fixed member side by means of magnetic pressing forces due to magnetic attractive action between the drive magnets and yokes.

Furthermore, an optical device of the invention has an imaging device for imaging a subject image formed by a lens device, and comprises:

a lens unit which is disposed inside the lens device and has an optical axis;

a movable member holding the lens unit, which makes the lens unit movable within a plane orthogonal to the optical axis;

an image pickup device for imaging the subject image formed by the lens device;

a fixed member for limiting the movement of the movable member in the optical axis direction;

at least three balls disposed between the movable member and fixed member, which can roll between the movable member and fixed member and make relative movements of the movable member and fixed member possible;

a vibration detecting unit for detecting vibration, which outputs vibration information corresponding to vibration; and a drive unit for driving the movable member within the optical axis orthogonal plane in accordance with the vibration information from the vibration detecting unit, which includes at least a drive magnet held by the fixed member and a yoke and a coil held by the movable member, or include at least a drive magnet held by the movable member and a yoke and a coil held by the fixed member, wherein the drive unit presses the movable member toward the fixed member side by means of a magnetic pressing force due to magnetic attractive action between the drive magnet and yoke.

Furthermore, an optical device of the invention has an imaging device for imaging a subject image formed by a lens device, and comprises:

a lens unit which is disposed inside the lens device and has an optical axis;

a movable member holding the lens unit, which makes the lens unit movable within a plane orthogonal to the optical axis;

an image pickup device for imaging the subject image formed by the lens device;

a fixed member for limiting the movement of the movable member in the optical axis direction;

at least three balls disposed between the movable member and fixed member, which can roll between the movable member and fixed member and make relative movements of the movable member and fixed member possible;

a vibration detecting unit for detecting vibration, which outputs vibration information corresponding to vibration; and a pitch direction drive unit for driving the movable member in the pitch direction within the optical axis orthogonal plane and a yaw direction drive unit for driving the movable member in the yaw direction within the optical axis orthogonal plane in accordance with the vibration information from the vibration detecting unit, where the pitch direction drive unit and yaw direction drive unit include drive magnets held by the fixed member and yokes and coils held by the movable member, or include drive magnets held by the movable member and yokes and coils held by the fixed member, wherein the pitch direction drive unit and yaw direction drive unit press the movable member toward the fixed member side by means of magnetic pressing forces due to magnetic attractive action between the drive magnets and yokes.

Furthermore, an optical device of the invention has an imaging device for imaging a subject image formed by from a lens device, and comprises:

a lens unit which is disposed inside the lens device and has an optical axis;

a movable member holding the lens unit, which makes the lens unit movable within a plane orthogonal to the optical axis;

an image pickup device for imaging the subject image formed by the lens device;

a fixed member for limiting the movement of the movable member in the optical axis direction;

at least three balls disposed between the movable member and fixed member, which can roll between the movable member and fixed member and make relative movements of the movable member and fixed member possible;

a vibration detecting unit for detecting vibration, which outputs vibration information corresponding to vibration; and a pitch direction drive unit for driving the movable member in the pitch direction within the optical axis orthogonal plane and a yaw direction drive unit for driving the movable member in the yaw direction within the optical axis orthogonal plane in accordance with the vibration information from the vibration detecting unit, where said pitch direction drive unit and yaw direction drive unit include drive magnets held by the fixed member and yokes and coils held by the movable member, or include drive magnets held by the movable member and yokes and coils held by the fixed member; and a pitch directional position detecting unit for detecting the moving position of the movable member in the pitch direction and a yaw directional position detecting unit for detecting the moving position of the movable member in the yaw direction, where the pitch detecting directional axis of the pitch directional position detecting unit and the yaw detecting directional axis of the yaw directional position detecting unit are substantially on and along the optical axis of the lens unit when the movable member is at a neutral position in the pitch direction and yaw direction, wherein the pitch direction drive unit and yaw direction drive unit press the movable member toward the fixed member side by means of magnetic pressing forces due to magnetic attractive action between the drive magnets and yokes.

Other constructions and objects of the invention will become clear while describing the embodiments.

DETAILED DESCRIPTION OF THE PREFERRED EMBODIMENTS

Figure 1:
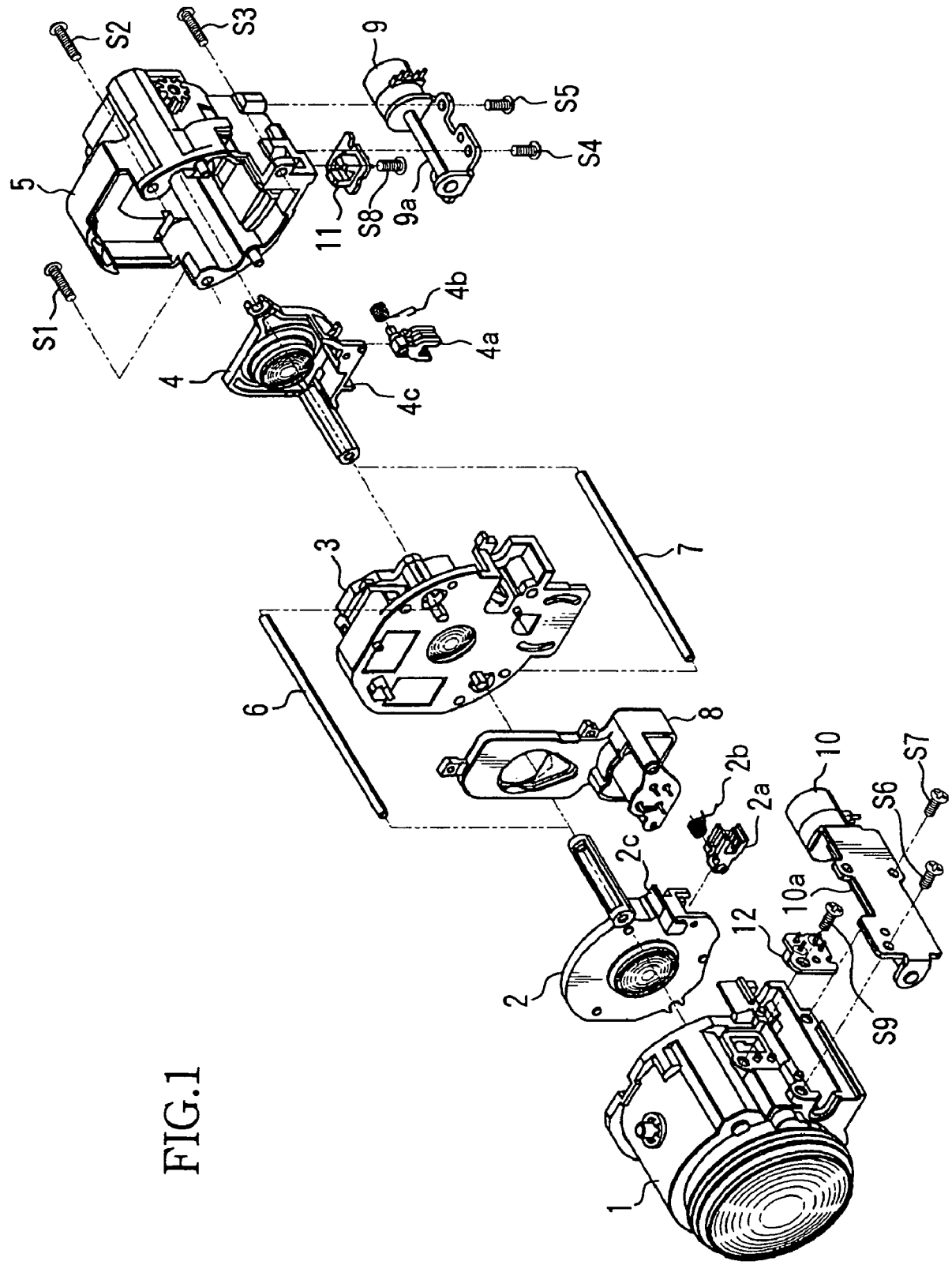
FIG. 1 is an exploded perspective view of a lens barrel of an embodiment of the invention.
Figure 2:
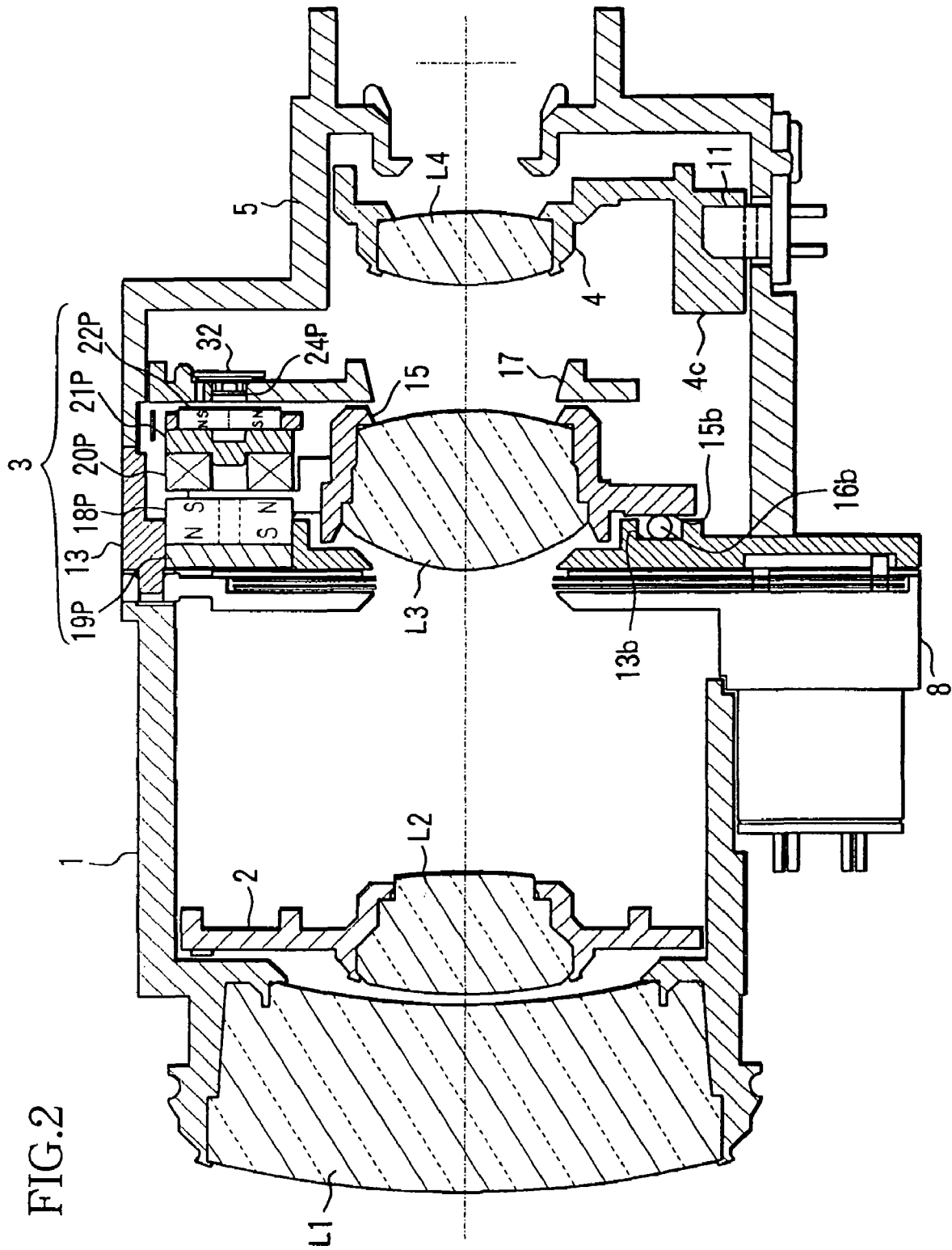
FIG. 2 is a sectional view of the lens barrel.

FIG. 1 and FIG. 2 show the construction of a lens barrel with a vibration correcting device of an embodiment of the invention. FIG. 1 shows the exploded perspective view of the lens barrel, and FIG. 2 shows the sectional view of the lens barrel. This lens barrel is used for a shooting device such as a video camera.

The optical system of this lens barrel is a zooming optical system composed of four groups, that is, a positive lens component, negative lens component, positive lens component, and positive lens component in order from the subject or observing object side.

L1 shows a fixed first lens group, L2 shows a second lens group which moves in the optical axis direction to carry out zooming operation, L3 shows a third lens group (vibration correcting lens: hereinafter referred to as shift lens) which moves within the optical axis orthogonal plane to carry out vibration correcting operation, and L4 shows a fourth lens group which moves in the optical axis direction to carry out focusing operation.

Fixed lens barrel 1 holds the first lens group L1, zoom moving frame 2 holds the second lens group L2, shift unit 3 makes the shift lens L3 movable within the optical axis orthogonal plane, focus moving frame 4 holds the fourth lens group L4, and rear lens barrel 5 is for fixing an image pickup device such as a CCD.

Two guide bars 6 and 7 are positioned and fixed between the fixed lens barrel 1 and rear lens barrel 5. The zoom moving frame 2 and focus moving frame 4 are movably supported in the optical axis direction by the guide bars 6 and 7.

The zoom moving frame 2 and focus moving frame 4 are fitted to one guide bar at sleeve portions with predetermined lengths in the optical axis direction, thereby the frames are prevented from tilting in the optical axis direction, and the frames are engaged with the other guide bar at the U-shaped groove potions, whereby the frames are prevented from rotating about the one guide bar.

The shift unit 3 is positioned and disposed between the fixed lens barrel 1 and rear lens barrel 5 and fixed by three screws S1, S2, and S3 tightened from the rear side.

Aperture stop unit 8 changes the aperture diameter of the optical system by moving two stop blades in opposite directions.

Stepping motor (hereinafter, referred to as focusing motor) 9 drives the fourth lens group L4 and causes it to carry out focusing operation, and has a rotor and a lead screw 9a that is coaxial with the rotor. With the lead screw 9a, rack 4a attached to the focus moving frame 4 is engaged, and the focus moving frame 4 (fourth lens group L4) is driven in the optical axis direction when the rotor and lead screw 9a rotate. The focus motor 9 is fixed to the rear lens barrel 4 by two screws S4 and S5.

By twisted coil spring 4b disposed between the focus moving frame 4 and rack 4a, the focus moving frame 4 is lopsidedly pressed in the guide bar diameter direction of the guide bars 6 and 7, the rack 4a is pressed in the optical axis direction with respect to the focus moving frame 4, and the rack 4a is further pressed in the engagement direction with the lead screw 9a, whereby looseness of the parts is eliminated.

Stepping motor (hereinafter, referred to as zoom motor) 10 drives the second lens group L2 in the optical axis direction and causes it to carry out zooming operation, and has a rotor and a lead screw b1a that is coaxial with the rotor. With the lead screw b1a, rack 2a attached to zoom moving frame 2 is engaged, and the zoom moving frame 2 (second lens group L2) is driven in the optical axis direction when the rotor and lead screw 10a rotate. The zoom motor 10 is fixed to the fixed lens barrel 7 by two screws S6 and S7.

By twisted coil spring 2b disposed between the zoom moving frame 2 and rack 2a, the zoom moving frame 2 is pressed in the guide bar diameter direction of the guide bars 6 and 7, the rack 2a is pressed in the optical axis direction with respect to the zoom moving frame 2, and the rack 2a is further pressed in the engagement direction with the lead screw 10a, whereby looseness of the parts is eliminated.

Focus reset switch 11 is composed of a photointerrupter, and detects changeover between light shielding and transmittance accompanying movements of a light shielding portion 4c on the focus moving frame 4 in the optical axis direction and outputs electric signals. A control circuit that is not shown judges whether or not the fourth lens group L4 is at a reference position based on an electric signal from the focus reset switch 11. This focus reset switch 11 is fixed to the rear lens barrel 5 by one screw S8.

Zoom reset switch 12 is composed of a photointerrupter, and detects changeover between light shielding and transmittance accompanying movements of a light shielding portion 2c on the zoom moving frame 2 in the optical axis direction, and outputs electric signals. A control circuit that is not shown judges whether or not the second lens group L2 is at a reference position based on an electric signal from the zoom reset switch 12. This zoom reset switch 12 is fixed to the fixed lens barrel 1 by one screw S9.

Figure 3:
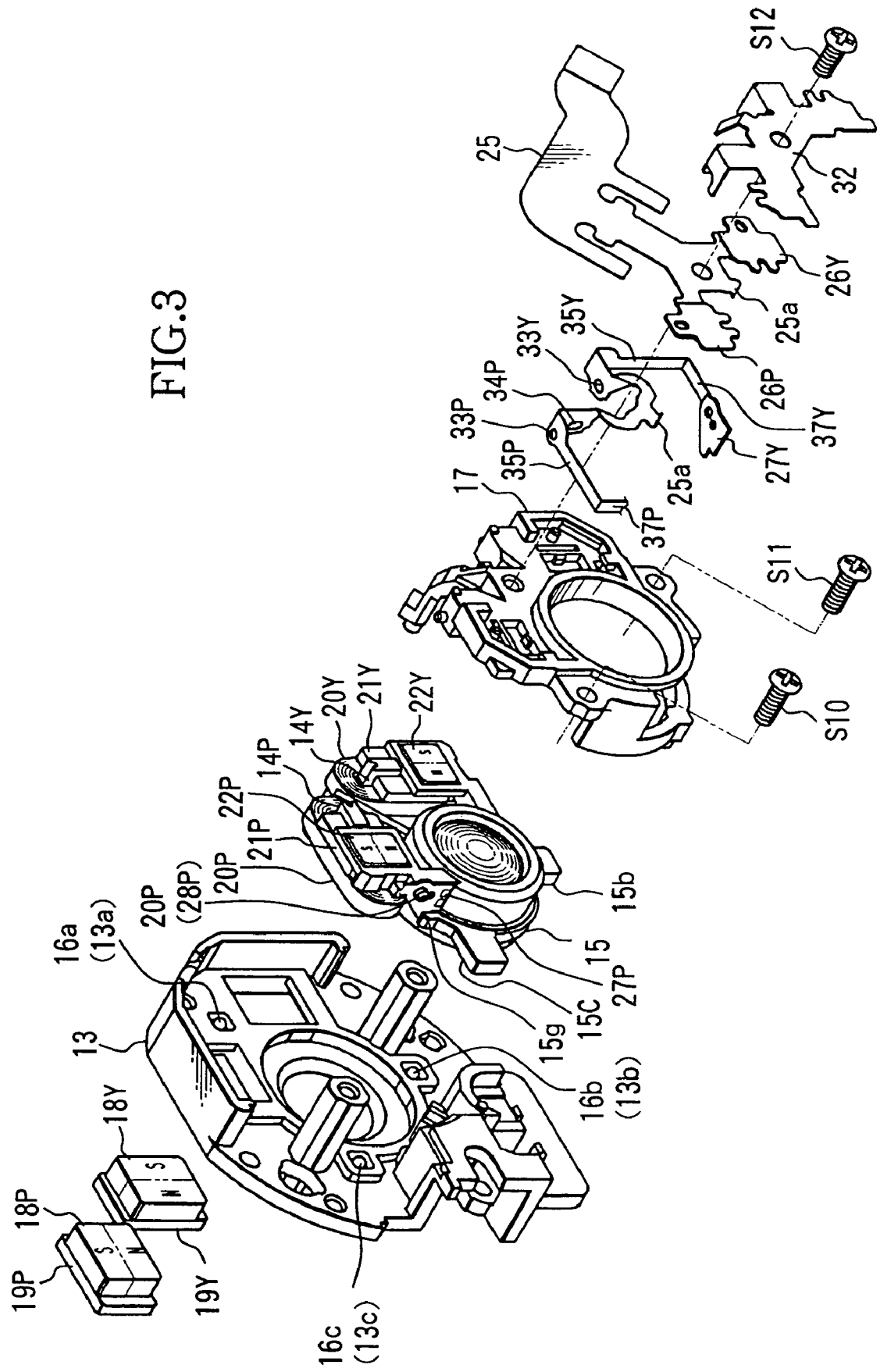
FIG. 3 is an exploded perspective view of a shift unit to be used for the lens barrel.

Next, the construction of shift unit 3 (vibration correcting device) which makes the third lens group L3 movable within the optical axis orthogonal plane is explained in detail with reference to FIG. 2 and FIG. 3. FIG. 3 shows an exploded condition of the shift unit 3 viewed from the rear side.

Shift base 13 composes the front side body of the shift unit 3, and is disposed and fixed between the fixed lens barrel 1 and rear lens barrel 5.

Shift frame 15 is a movable member for holding the shift lens L3, and can shift with respect to the shift base 13 as a fixed member within the optical axis orthogonal plane in the pitch direction to correct image vibration due to vibration in the pitch direction (vertical angle change of the camera) and in the yaw direction to correct image vibration due to vibration in the yaw direction (horizontal angle change of the camera).

Three balls 16a, 16b, and 16c are disposed between the shift base 13 and shift frame 15. The balls 16a, 16b, and 16c are made from a material such as SUS304 (austenite-based stainless steel) so as not to be attracted by drive magnets disposed in the vicinities as described later.

The balls 16a, 16b, and 16c come into contact with the surfaces 13a, 13b, and 13c on the shift base 13 and the surfaces 15a, 15b, and 15c of the shift frame 15, respectively. The contact surfaces at the three portions are perpendicular to the optical axis of the optical system, and if the nominal diameters of the three balls 13a, 13b, and 13c are equal to each other, by suppressing the positional differences between the contact surfaces at the three portions in the optical axis direction to be small, the shift frame 15 can be held and guided to shift while maintaining a posture perpendicular to the optical axis.

Sensor base 17 composes the rear side body, and is positioned by two positioning pins and connected to the shift base 13 by two screws S10 and S11.

Next, the construction of a drive unit for shift-driving the shift frame 15 is explained. The pitch direction drive unit and yaw direction drive unit have the same construction in the pitch direction and yaw direction and have only a phase difference of 90 degrees about the optical axis, and the pitch directional position detecting unit and yaw directional position detecting unit have the same construction in the pitch direction and yaw direction, and have only a phase difference of 90 degrees about the optical axis. Therefore, the pitch direction drive unit and position detecting unit shown in FIG. 2 are explained herein. Among the numerical references showing the parts in the figure, "P" is attached to the numerical references showing the components in the pitch direction, and "Y" is attached to the numerical references showing the components in the yaw direction.

Drive magnet 18p is two-pole magnetized in the radial direction with respect to the optical axis, and back yoke 19p is for closing a magnetic flux at the front side in the optical axis direction of the drive magnet 18p. The back yoke 19p and drive magnet 18p are held at attaching portion 13p of the shift base 13. Coil 20p is fixed to the shift frame 15 by means of adhesion, and yoke 21p is for closing a magnetic flux at the rear side in the optical axis direction of the drive magnet 18p. The yoke 21p has a projected shape in the optical axis direction which is roughly the same as that of the drive magnet 18p.

Member 14p is for positioning the yoke 21p, and the yoke 21p is positioned by this positioning member 14p and fixed to the back of the coil 20p.

The drive magnet 18p and back yoke 19p are fixed to the shift base 13, and the yoke 21p is fixed to the shift frame 15 together with the coil 20p.

The drive magnet 18p, back yoke 19p, and yoke 20p form a magnetic circuit. When a current is made to flow into the coil 20p disposed inside this magnetic circuit, a Lorentz force is generated in the direction roughly perpendicular to the magnetizing boundary between two poles of the drive magnet 18p due to mutual repulsion between magnetic flux lines generated at the magnet and coil, whereby the shift frame 15 shifts.

The drive unit thus constructed are provided in the pitch direction and yaw direction, so that drive forces can be applied to the shift member 15 in the pitch direction and yaw direction that are orthogonal within the optical axis orthogonal plane.

That is, in this embodiment, a so-called moving coil type shift unit in which a coil is disposed in the gap of the magnetic circuit including a magnet and the shift frame 15 (shift lens L3) is driven to shift together with the coil by supplying power to the coil.

Magnetic attractive action is generated between the drive magnet 18p and yoke 21p, and the yoke 21p is attracted by this attractive force toward the drive magnet 18p side. That is, the magnetic circuit and balls 16a through 16c are disposed so that a resultant force in the magnetic circuit in the pitch direction and yaw direction acts inside the three balls 16a through 16c, whereby the shift frame 15 is pressed toward the shift base 13 side via the three balls 16a through 16c.

Between the three balls 16a through 16c, the contact surfaces of the shift base 13 and shift frame 15, lubricating oil such as grease is applied, which has a viscosity at a degree by which the balls 16 are prevented from easily slipping off the contact surfaces of the shift base 13 and shift frame 15 without pressing by the abovementioned magnetic attraction. Thereby, even when an inertia exceeding the abovementioned magnetic attractive force is applied to the shift frame 15 and the contact surfaces of the shift frame 15 separate from the balls 16a through 16c, the balls 16a through 16c can be prevented from easily displacing. Furthermore, it is considered that an excellent pressing condition can be maintained in actual shooting by setting a totalized magnetic pressing force of the magnetic pressing forces by the magnetic circuits in the pitch direction and yaw direction to be greater than the weight of the shift frame 15 including the shift lens L3. Moreover, the magnetic pressing force may be three, five, or ten times the weight of the shift frame 15.

Figure 4:
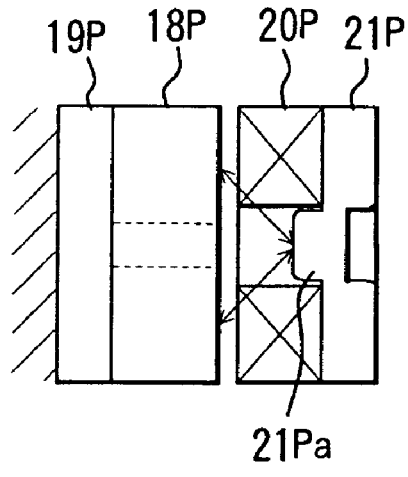
FIGS. 4(a), 4(b) and 4(c) are drawings for explaining a drive means of the shift unit.
Figure 4:
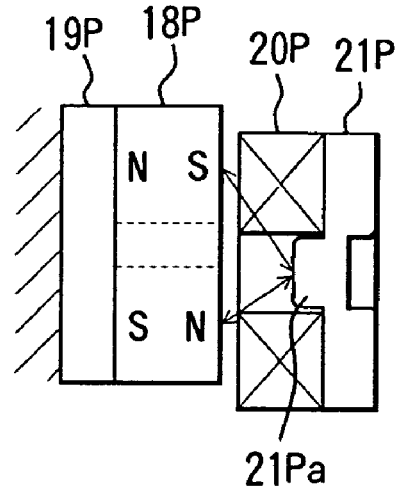
Figure 4:
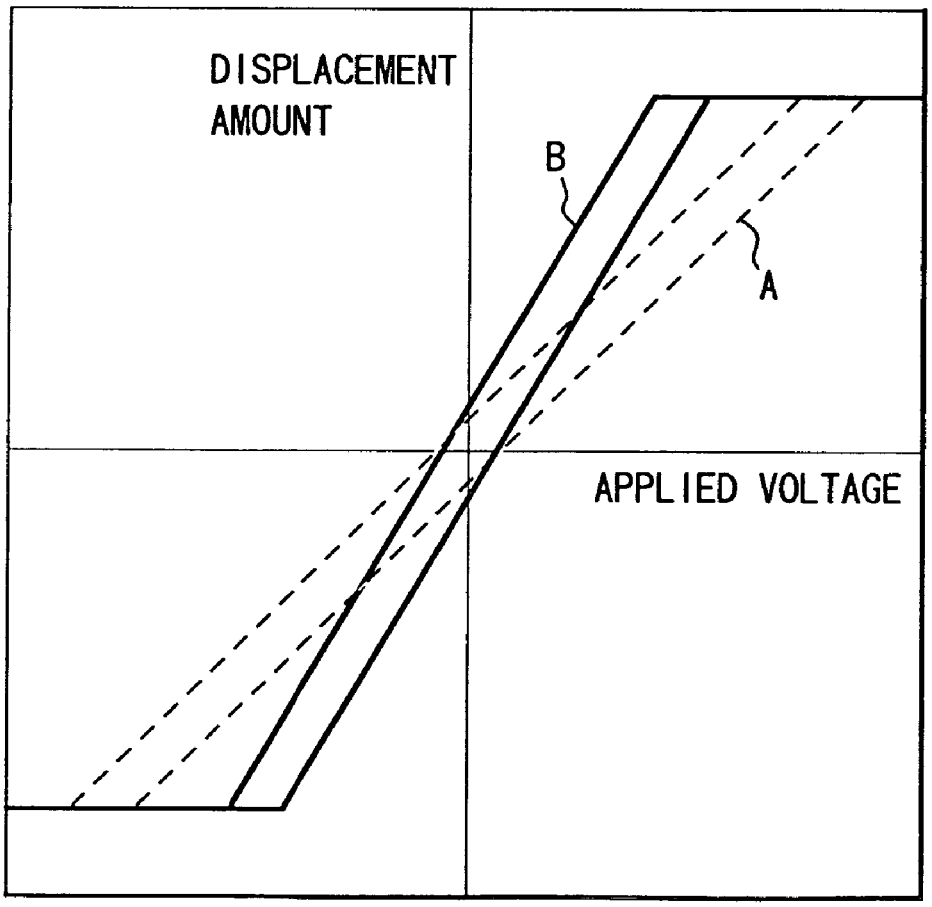

Next, the condition of the shift frame 15 when being driven is explained with reference to FIGS. 4(a) through 4(c). FIGS. 4(a) and 4(b) show only the portion of the abovementioned drive units. In the condition of FIG. 4(a), a condition is shown where the shift frame 15 is at a neutral position in the pitch direction and yaw direction at which the optical axis of the shift lens L3 roughly coincides with the optical axis of other lens within the lens barrel.

Projection 21pa is formed on the yoke 21p by means of half-blanking, and positioned at the boundary of the two-pole magnetizing of the drive magnet 18p. At this time, the projection 21pa is at distances equal to each other from both of the two magnetizing poles of the drive magnet 18p, so that the forces for attracting the projection 21pa become equal to each other, and a balanced condition is obtained.

As mentioned above, since the yoke 21p has a projected shape in the optical axis direction which is roughly the same as that of the drive magnet 18p, a magnetic flux from the two poles of the drive magnet 18p closes through the yoke 21p, and the condition of FIG. 4(a) is a magnetically more stable condition.

FIG. 4(b) shows a condition where the coil 20p and yoke 21p (that is, the shift frame 15) have shifted downward in response to power supply to the coil 20p. In accordance with a force generated by the coil 20p, they displace in the pitch direction form the stable condition of FIG. 4(a).

The condition of FIG. 4(b) shows displacement from the stable condition of the magnetic circuit. When power supply to the coil 20p is stopped, the condition is restored to the condition of FIG. 4(a), however, when the projection 21pa of the yoke 21p displaces downward, the coil and yoke approach the N pole of the drive magnet 18P and become distant from the S pole.

The magnitude of a magnetic force is in inverse proportion to a square of a distance, so that a force from a magnetic pole to be applied to the projection 21pa acts in the direction to promote the displacement.

FIG. 4(c) explains this, wherein the horizontal axis shows voltage values to be applied to the coil 20p, and the vertical axis shows the displacement amounts of the shift frame 15. The intersection of both axes is at a point at which the voltage to be applied to the coil 20p is "zero", which shows that the shift frame 15 is at a neutral position.

If there is no projection 21pa at the yoke 21p, the drive curve becomes as shown by the dashed line A of the figure, and if there is a projection 21pa, due to the abovementioned effect of this projection 21pa, a force for closing the magnetic circuit is canceled and the drive curve becomes as shown by the solid line B. That is, the shift frame 15 can be greatly displaced by a small voltage applied.

By changing the size of the yoke 21p and the size of the projection 21pa, the center position of the magnetic force can be controlled, and for example, to magnetically support the tare weight of the shift frame 15, the yoke 21p may be intentionally shifted downward or the projection 21pa may be shifted downward.

Next, the relationship of the shift base 13 and shift frame 15 with respect to the ball 16b is explained in FIGS. 5(a) through 5(d). With respect to other balls 16a and 16c, the same relationship can also be applied.

In the condition of FIG. 5(a), the shift frame 15 is at a neutral position, and the ball 16b is also positioned at the center in a limiting space (movement limiting portion) which is a containing portion for limiting the movement of the ball 16b, provided around the contact surface 13b of the shift base 13. The contact surface 13b is a surface equivalent to the bottom surface of the concave portion having a rectangular (square) opening in a view in the optical axis direction, and the end surface of the limiting space is composed of the inner wall surface of this concave portion.

FIG. 5(b) shows the condition where the shift frame 15 has been driven toward the downward arrow direction by the drive means in the pitch direction from the condition of FIG. 5(a). In the condition of FIG. 5(b), the shift frame 15 has been driven up to the end of the unillustrated movable machine provided on the shift base 13 and displaced by an amount of a from the neutral position.

The ball 16b is disposed and supported between the shift base 13 and shift frame 15, so that the ball rolls from the position of FIG. 5(a) to the position of FIG. 5(b). Herein, the rolling friction is sufficiently small in comparison with the sliding friction, so that the ball 16b does not slide on the contact surfaces 13b and 15b of the shift base 13 and shift frame 15, and the shift frame 15 moves downward with respect to the shift base 13 while rolling the ball 16b.

At this time, the shift frame 15 and shift base 13 move in opposite directions to each other with respect to the center of the ball 16b, so that the movement amount b of the ball 16a with respect to the shift base 13 is half (a/2) of the movement amount a of the shift frame 15.

FIG. 5(c) shows the ball 16b and limiting space of the shift base 13, which are shown in FIG. 5(b), viewed from the rear side. The ball 16b is positioned at the center inside the rectangular space enclosed by a pair of limiting end surfaces extending in the pitch direction and a pair of limiting end surfaces extending in the yaw direction.

The size of the inside of the limiting space is expressed as (r+b+c) from the center when the radius of the ball is defined as r. c shows a mechanical allowance. That is, the size of the inside of the limiting space is a size obtained by summing up the diameter of the ball 16b, the maximum movement amounts (b×2) of the ball 16b toward both sides in the pitch direction and toward both sides in the yaw direction from the center in accordance with shift movement of the shift frame 15, and a mechanical allowance (c×2).

Herein, in a case where the ball 16b is at a position shifted downward by a degree more than the allowance c from the condition where the ball is at the center in the limiting space shown in FIG. 5(c), if the shift frame 15 is driven downward by the amount of a as shown in FIG. 5(b), the ball 16b comes into contact with the limiting end surface before the shift frame 15 moves by the amount of a and comes into contact with the mechanical end, and during driving of the shift frame 15 after that, the ball 16*b* slides with respect to the shift frame 15 while being pressed against the limiting end surface.

Then, when the shift frame 15 is further returned by the amount of a toward the center position from the condition where the drive by the amount of a of the shift frame 15 is ended, the ball 16*b* rolls and returns to the position with a distance c from the center of the limiting space.

Figure 5:
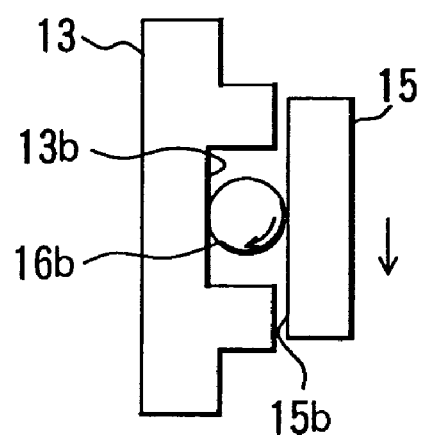
FIGS. 5(a), 5(b), 5(c) and 5(d) are drawings for explaining a ball movement limiting space in the shift unit.
Figure 5:
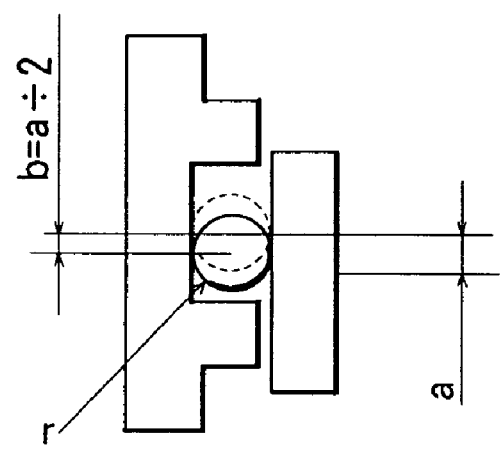
Figure 5:
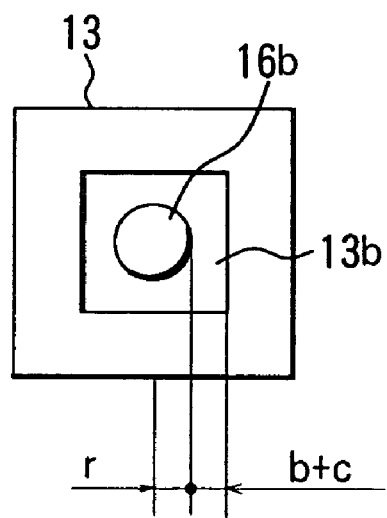
Figure 5:
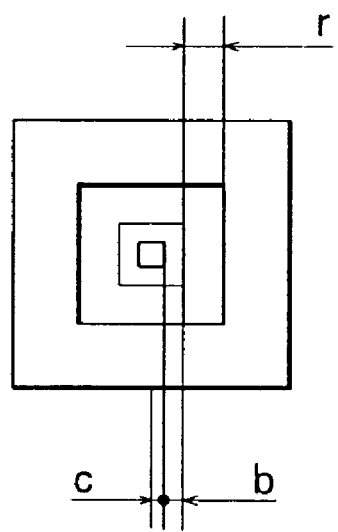

Thus, when the shift frame 15 is driven to the mechanical end at the both sides in the pitch direction and yaw direction and then returned to the center position, regardless of the initial position of the ball 16*b*, as shown in FIG. 5(*d*), the center of the ball 16*b* is positioned within the rectangular range (initial positioning range) composed by the four sides at the distance of c from the center of the limiting space. This serial operation is referred to as a ball reset operation.

Normally, optical performance of lenses is designed so that the lenses exhibit maximum performance when the optical axes of the lenses coincide with each other. Therefore, as the shift lens L3 becomes eccentric in response to other lenses, the condition becomes disadvantageous in terms of performance. However, in the lens barrel of this embodiment, optical performance which does not come into question in practical use within the shift range of the shift lens L3 can be achieved.

When the shift frame 15 is driven in the pitch direction and yaw direction at the same time and by the same amount, the frame moves to the 2-time position in the middle direction of the pitch and yaw directions. Then, in the actual use condition, the shift frame 15 is rarely driven in a completely independent condition in the pitch direction or yaw direction, but shifts within a circle or a polygon which is close to a circle around the optical axis by considering the position in the other direction.

At this time, the three balls 16*a* through 16*c* roll within a half range which is similar to the actual movement range.

On the other hand, each of the abovementioned limiting spaces containing balls 16*a* through 16*c* have a rectangular shape with two pairs of sides that are parallel to each other in the pitch direction and yaw direction, however, if this shape is a circle or polygon along the range of movement of the ball in an actual use condition as mentioned above, when resetting the ball, it occurs that the ball cannot be correctly moved to a position at which the ball does not come into contact with the limiting end surface in an actual use condition.

Therefore, as mentioned above, the size of the limiting space which is a containing portion is set to be a size obtained by summing the diameter of the ball 16*b*, the maximum movement amount (b×2) of the ball 16*b* toward both sides in the pitch direction and both sides in the yaw direction from the center in accordance with shift movement of the shift frame 15 and a mechanical allowance (c×2). Thereby, for example, when the ball is lopsidedly moved to two limiting end surfaces adjacent to each other at one corner (composing a corner), the spaces between the ball and the two limiting end surfaces in the pitch direction and yaw direction become larger (2b+2c) than half amount b of the mechanical maximum movable amount (or maximum movable amount in actual use) in each direction of the shift frame 15.

That is, in a case where the movable range of the ball is not rectangular, but circular or polygonal or octagonal, when the ball shifts to an optional position, and the space for ball rolling and returning to the opposite direction after contacting the end in response to reset operation is insufficient, the ball comes into contact with the end again, and as a result, initial positioning at the center becomes impossible. The present embodiment avoids this problem.

To avoid the abovementioned problem, the size of the limiting space is set as mentioned above, whereby the areas of the surfaces 13*a* through 13*c* and 15*a* through 15*c* of the shift base 13 and shift frame 15 which come into contact with the ball can be reduced to be a minimum. Then, by resetting the balls 16*a* through 16*c* in this condition, the balls do not come into contact with the limiting end surfaces in actual use, and the shift frame 15 is supported and guided by only the rolling of the ball. Therefore, drive resistance of the shift frame 15 when carrying out vibration correcting operation can be reduced to be small, highly accurate vibration correcting operation is possible, and the shift unit 3 can be downsized as well as the drive means in accordance with a reduction in a drive force required for the shift drive.

Furthermore, as mentioned above, by applying lubricating oil between the balls 16*a* through 16*c* and the contact surfaces 13*a* through 13*c* and 15*a* through 15*c*, the sliding frictional forces between the balls and contact surfaces are reduced, whereby more highly accurate vibration correcting control and downsizing of the shift unit 3 can be achieved.

Next, the position detecting means is explained with reference to FIG. 2 and FIG. 3. In these figures, detecting magnet 22*p* is two-pole magnetized in the radial direction with respect to the optical axis, and a magnetic flux at the front side in the optical axis direction is closed by the yoke 21*p*. The detecting magnet 22*p* is fixed to the shift frame 15 at the rear side (opposite side to the coil 20*p* across the yoke 21*p*) of the yoke 21*p*.

Hall element 24*p* converts magnetic flux density into an electric signal, and is positioned and fixed to sensor base 17. A position detecting means is comprised of the detecting magnet 22*p*, yoke 21*p*, and hall element 24*p*. The yoke 21*p* is shared by the drive means and position detecting means, whereby the vibration correction control performance can be improved by means of reduction in the number of parts, downsizing of the shift unit 3, and furthermore, reduction in weight of the shift frame 15 in comparison with the case where a yoke which is exclusive for the position detecting means is provided.

Figure 6:
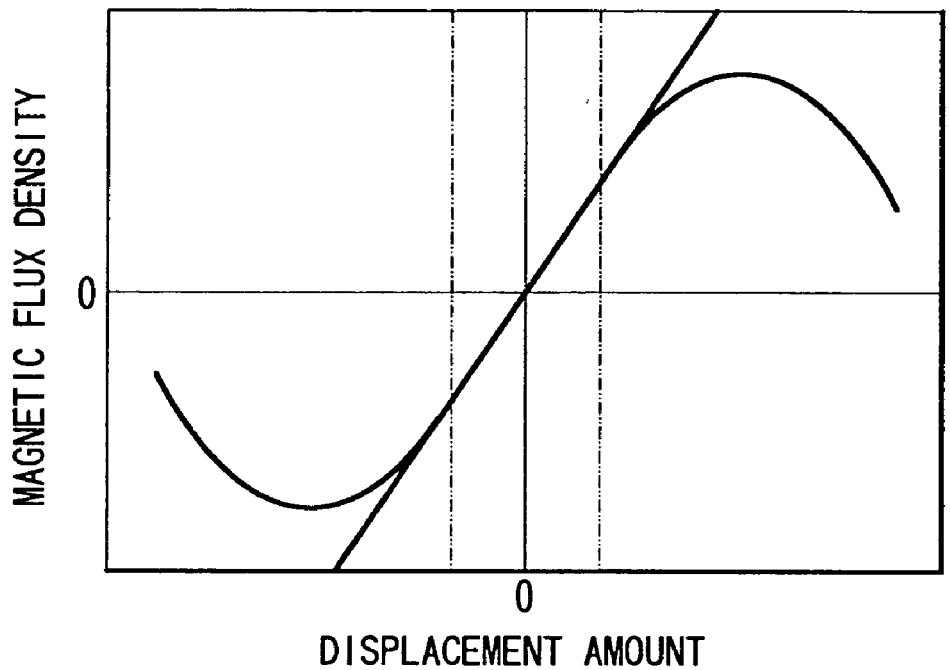
FIG. 6 is a drawing for explaining the principle of a position detecting means provided in the shift unit.

Herein, the condition of the magnetic flux at the rear side in the optical axis of the detecting magnet 22*p* is explained with reference to FIG. 6. In FIG. 6, the horizontal axis shows positions in the radial direction with respect to the optical axis, and the vertical axis shows magnetic flux density. The center of the horizontal axis shows a boundary portion between the two magnetizing poles of the detecting magnet 22*p*, and herein, the magnetic density is zero. This position corresponds to the neutral position at which the optical axis of the shift lens L3 roughly coincides with optical axes of other lenses.

In FIG. 6, within the range of the displacement amount shown by the alternate long and short chain lines, the magnetic flux density linearly changes so as not to come into problem in practical use. The change in magnetic flux density is detected from the hall element 24*p* as an electric signal by means of proper signal processing, whereby the position of the shift lens L3 can be detected.

Figure 7:
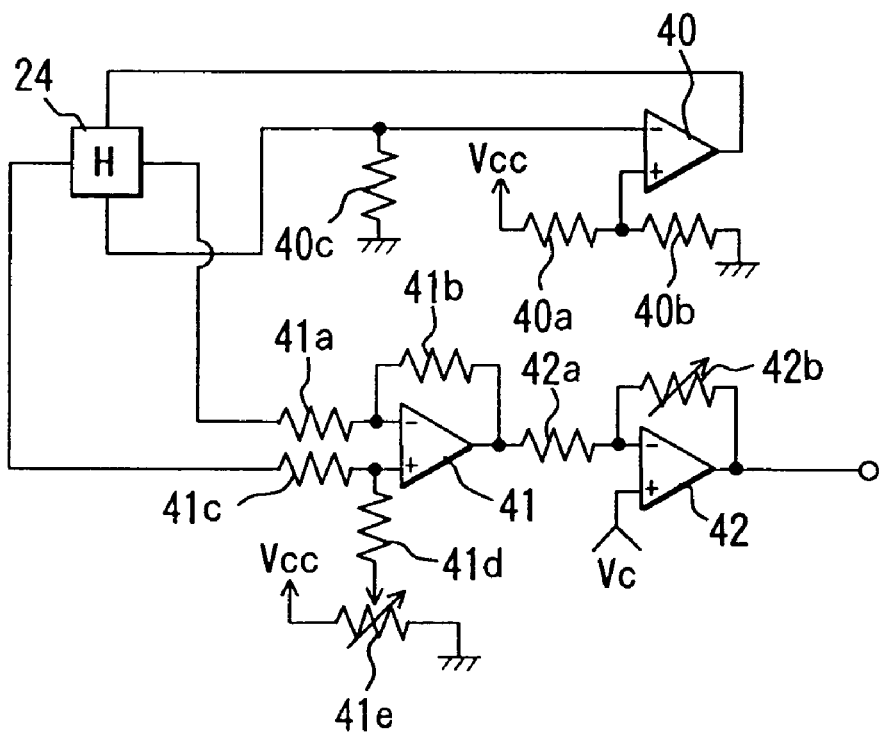
FIG. 7 is a diagram of a signal processing circuit of a hall element comprising the position detecting means.

In FIG. 7, an example of a signal processing circuit of the hall element 24*p* is shown. In this figure, 24 denotes a hall element and 40 denotes an operational amplifier. This operational amplifier 40 is combined with the resistors 40*a*, 40*b*, and 40*c* to supply a constant current to the hall element 24. The output in response to the magnetic flux density of the hall element 24 is differentially amplified by operational amplifier 41 and resistors 41*a*, 41*b*, 41*c*, and 41*d*.

Resistor 41*e* is a variable resistor, which can shift the level of the electric output signal in response to the magnetic flux density by changing its resistance value. In the case of this embodiment, the output is adjusted so as to become equal to the reference potential Vc when the shift lens L3 is at the neutral position.

Operational amplifier 42 is combined with resistors 42a and 42b and amplifies the output of the operational amplifier 41 inverse to the reference potential Vc. Then, the resistance value of the variable resistor 42b is changed, whereby the ratio of the change in output voltage to the change in magnetic flux density can be adjusted to be a predetermined value.

In FIG. 3, flexible substrate 25 has flexibility and is for electrically connecting the coil 20p and hall element 24p to external circuits. This flexible substrate 25 is turned up at folding portions 25a (in FIG. 3, two folding portions 25a are shown, and for easy understanding this illustration, the substrate is cut at the folding portion 25a in the illustration). Hall element 24p is mounted at the front side in the optical axis direction of element holding portion 26p. Each of the folding portions 25a is branched into both a pitch side and a yaw side, and have band-shaped portions 35p and 37p by means of bending portions. Hole 28p formed at a part of the front end portion 27p is engaged by pin 29p formed at the shift frame 15 so that the portion 27p can rotate about the pin. Both terminals of the coil 20p are soldered to land portions 30p and 31p provided at the front end portion 27p.

Presser plate 32 is for fixing the flexible substrate 25 to the sensor base 17, and is fixed to the sensor base 17 by one screw S12.

Next, the connecting portion which is a fixing portion of the flexible substrate 25 for absorbing movements of the sensor base 17 and shift frame 15 is explained in detail with reference to FIGS. 8(a) and 8(b).

Figure 8:
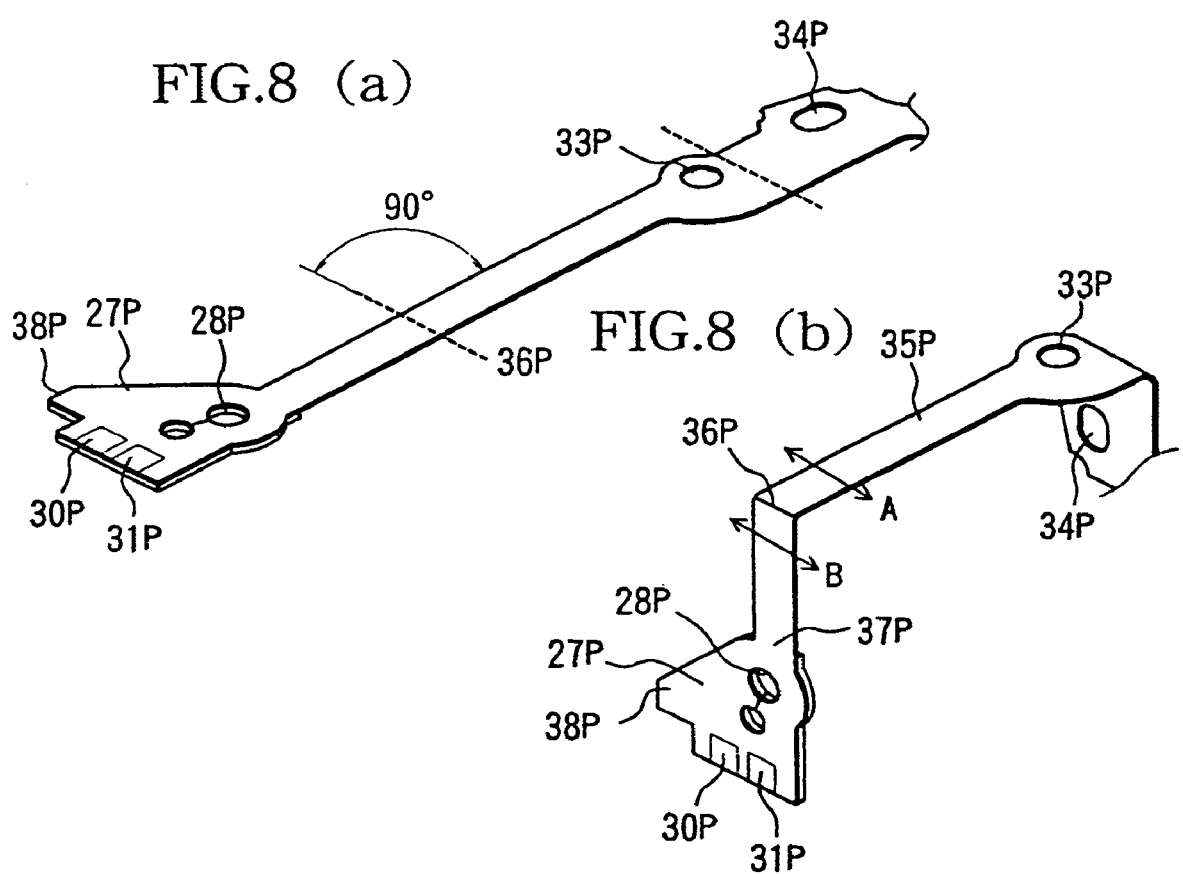
FIGS. 8(a) and 8(b) are explanatory views of a flexible substrate to be used for the shift unit.

FIG. 8(a) shows a shape of the flexible substrate 25 before being bent. At the portion to be fixed to the sensor base 17, hole 33p and slot 34p are formed in line in the longitudinal direction. Pins are formed at portions of the sensor base 17 corresponding to the hole 33p and slot 34p, and the position of the flexible substrate 25 is determined by the hole 33p, and the extending direction from the fixing portion is determined by the slot 34p.

The bending portion between the hole 33p and slot 34p is pressed by the presser plate 32 against the sensor base 17. The band-shaped portions 35p and 37p are bent at roughly 90 degrees at the bending portion 36p. The movements of the shift frame 15 in the pitch direction and yaw direction are absorbed by the deflection of the band-shaped portions 35p and 37p in the longitudinal direction.

The hole 28p of the front end portion 27p is engaged by the pin 29p of the shift frame 15 as mentioned above, and the pin 29p is a stepped pin so as to prevent the front end portion 27 from coming off.

The projection 38p of the front end portion 27p fits between the receiving surface of the shift frame 15 and pressing portion 15g formed and spaced from this receiving surface, whereby the front end portion 27p is prevented from slipping off the pin 29p while maintaining rotation independent of the pin 29p within a certain range.

Herein, if the bending portion 36p is bent at exactly 90 degrees with respect to the longitudinal direction, the hole 28p of the front end portion 27p reaches the position of the pin 29p, so that unnatural deformation does not occur at the band-shaped portions 35p and 37p of the flexible substrate 25, however, if the bending portion 36p is bent by deviating 90 degrees with respect to the longitudinal direction, the position of the hole 28p of the front end portion 27p and the position of the pin 29p deviate from each other in accordance with the tilt of the bending in the optical axis direction.

At this time, the front end portion 27p can rotate by a degree corresponding to the deviation of the bending, the deviation of the bending of the bending portion 36p can be absorbed by the twisting of the band-shaped portions 35p and 37p.

If the front end portion 27p is structured so as not to rotate, when the bending of the bending portion 26p deviates, a bending force in the longitudinal direction (bending in the arrow A and arrow B directions in the figure) by which the band-shaped portions 35p and 37p are not easily bent is applied to the band-shaped portions 35p and 37p, and the shift frame 15 is strongly pressed toward the optical axis direction. Thereby, due to an increase in friction at the sliding portions between the balls 16a through 16c, shift base 13, and the shift frame 15, the movement of the shift frame 15 deteriorates.

Even when the pressing of the presser plate 32 at the connecting portion to the sensor base 17 deviates and the extending direction of the flexible substrate 25 slightly deviates, the position of the hole 28p in the optical axis direction with respect to the pin 29p deviates, so that the elastic force in the optical axis direction by the flexible substrate 25 is eased by the rotation of the front end portion 27p.

Next, the construction and disposition of the position detecting means and the rotation suppressing function and operation for the function of the shift frame 15 by means of two magnetic circuits in the pitch and yaw directions are explained with reference to FIG. 9(a) and FIG. 9(b).

Figure 9:
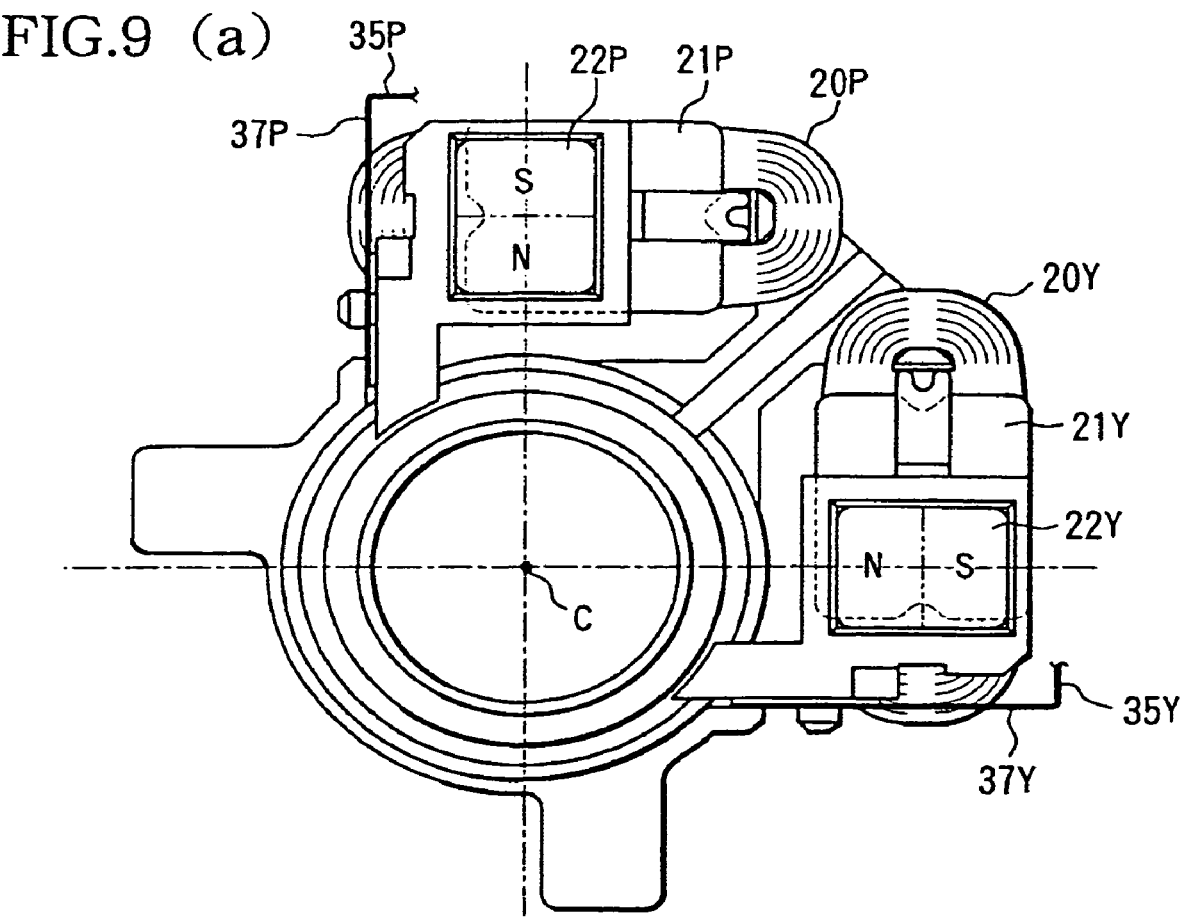
FIGS. 9(a) and 9(b) are drawings for explaining the characteristics of the shift frame of the position detecting means with respect to rotation.
Figure 9:
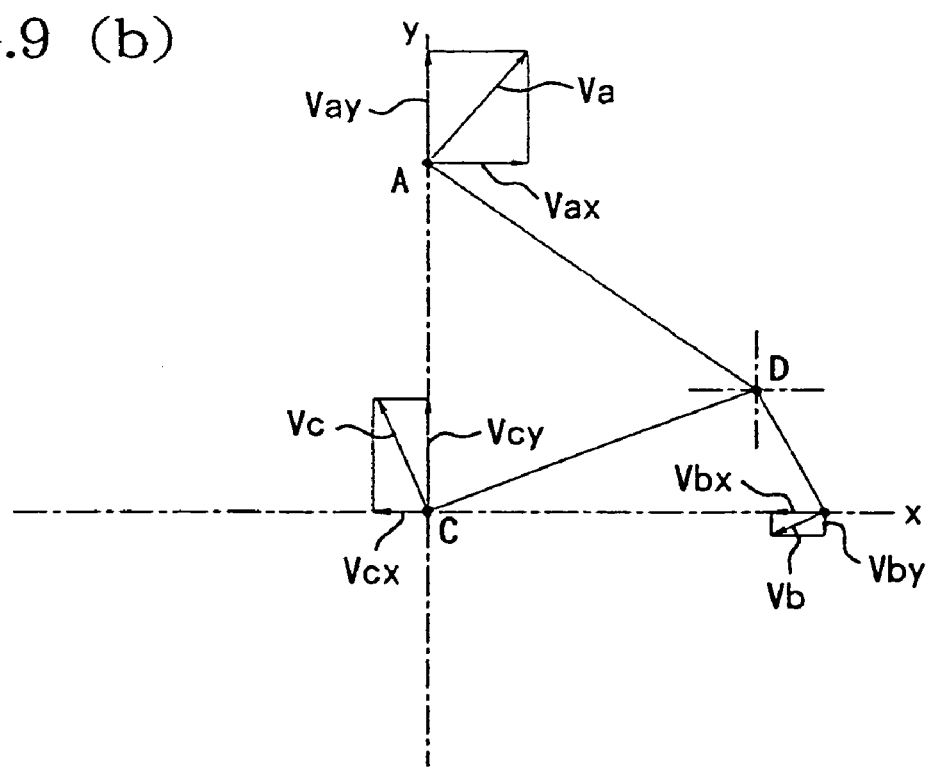

FIG. 9(a) shows the shift frame 15 from the rear side in the optical axis direction. The two magnetic circuits in the pitch directions and yaw directions press the shift frame 15 in the optical axis direction. As mentioned above, the yokes 21p and 21y and drive magnets 18p and 18y have the same projected shape in the optical axis direction. Therefore, the rotation of the shift frame 15 about the optical axis with respect to the shift base 13 (sensor base 17) is suppressed by the attractive action of the two drive magnets 18p and 18y in the pitch and yaw directions fixed to the shift base 13.

The detecting magnets 22p and 22y are disposed so that the boundaries between the two magnetizing poles become perpendicular to their detecting directional axes (pitch directional axis and yaw directional axis), and when the movement of the detecting directional axis of one of the detecting magnets is smaller than the size of the other magnet, the magnetic flux distribution with respect to the hall element does not substantially change. Therefore, the position of the shift frame 15 can be detected in a manner in which the two axes are independent from each other.

Furthermore, the intersection of the detecting directional axes of the two position detecting means in the pitch and yaw directions coincides with the optical axis of other lenses, so that even when the shift frame 15 rotates about the optical axis, if the rotation is within a relatively small angle, change in the output value does not occur to a degree at which the change come into question in practical use.

The movement of the shift frame 15 when a drive force is applied to the shift frame 15 by the drive means differs depending on the positional relationship between the position of occurrence of the force of the drive means and the center of gravity of the shift frame 15 and the connecting position and shape of the connected flexible substrate 25. Since the two magnetic circuits only suppress the rotation of the shift frame 15, the shift frame 15 occasionally rotates about the optical axis accompanying the shift drive of the shift frame 15.

Change in output value from the position detecting means at this time is explained with reference to FIG. 9(b). On the assumption that the position detecting point in the pitch direction is defined as A, the position detecting point in the yaw direction is defined as B, and the optical axis of other lenses is defined as C, when the shift frame 15 rotates about the point D, the movements of the abovementioned respective points are observed.

When the rotation angle is not very large, the respective points A, B, and C move in the direction perpendicular to the lines between the points and the point D.

Herein, the movement vectors of the points A, B, and C are defined as Va, Vb, and Vc, respectively, and components obtained by resolving these vectors in the directions of extensions of the detecting directional axis x in the yoke direction and the detecting directional axis y in the pitch direction are defined as Vax, Vay, Vbx, Vby, Vcx, and Vcy.

The position detecting means rarely have sensitivity in the direction perpendicular to the detecting directional axes as mentioned above, so that the vectors Vax and Vby are not detected by the position detecting means.

Since the intersection of the two detecting directional axes x and y coincides with the optical axis C, the following relationships:

Vcx=Vbx

Vcy=Vay are established with respect to the movement vectors Vcx and Vcy of the optical axis C.

This means that the change in the optical axis position of the shift lens L3 in accordance with the rotation about a point apart from the optical axis C, that is, the shift amount can be correctly detected by the position detecting means without being influenced by the rotation, and by control of positioning the drive means and position detecting means (described later), the shift frame 15 can be moved to a correct position.

Figure 10:
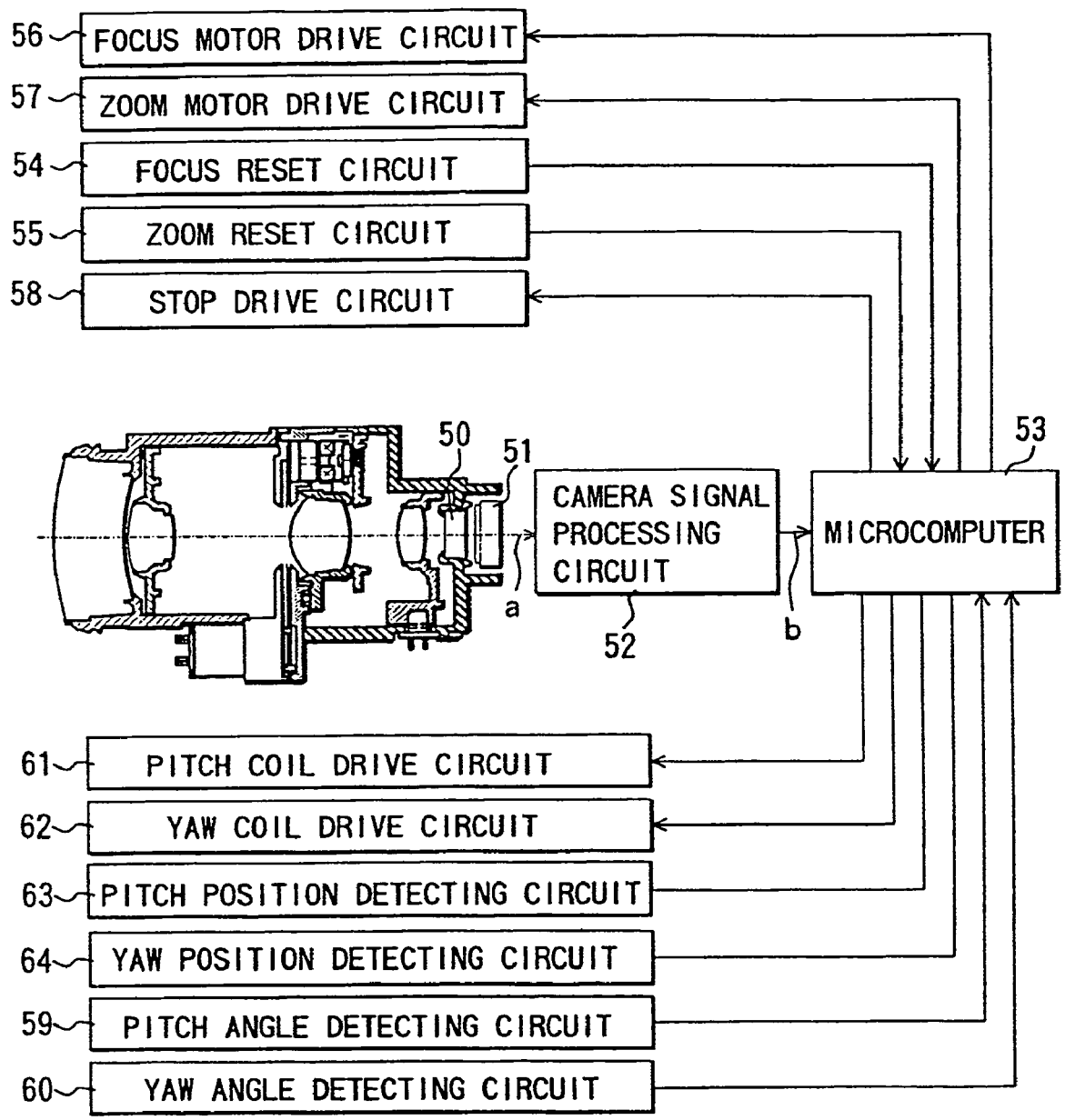
FIG. 10 is a block diagram showing the electric circuitry of a photographic device including the lens barrel.

FIG. 10 shows electric circuitry in a imaging device (video camera or the like) in a lens barrel with the vibration correcting function. In the lens barrel shown in FIG. 2, optical low-pass filter 50 for eliminating high frequency components in a spatial frequency of a subject image and image pickup device 51 such as a CCD for converting an optical image formed on the focus plane into an electric signal are provided.

Furthermore, in the camera body, camera signal processing circuit 52 for processing an electric signal a read-out from the image pickup device 51 into an image signal b, and microcomputer 53 as a control circuit for controlling lens drive are provided.

When the camera power supply is turned on, while monitoring the outputs of focus reset circuit 54 and zoom reset circuit 55, the microcomputer 53 drives focus motor drive circuit 56 and zoom motor drive circuit 57 to rotate the focus motor 9 and zoom motor 10 to move the focus moving frame 4 and zoom moving frame 2 in the optical axis direction.

The outputs of the focus reset circuit 54 and zoom reset circuit 55 are inverted at predetermined positions of the focus moving frame 4 and zoom moving frame 2 (boundaries at which the light shielding portions provided on the moving frames shield the light emitting portions of the reset switches 11 and 12). This serial operation is referred to as reset operation for the focus moving frame 4 and zoom moving frame 2.

The microcomputer 53 counts the number of drive steps of the focus motor 9 and zoom motor 10 thereafter based on the positions, whereby the computer can recognize the absolute positions of the focus moving frame (the fourth lens group L4) and zoom moving frame 2 (the second lens group L2). By counting the number of drive steps of the zoom motor 10, accurate focal length information can be obtained.

Stop drive circuit 58 is for driving the aperture stop unit 8, and the aperture diameter is controlled based on brightness information b of the image signal taken in the microcomputer 53.

Pitch and yaw angle detecting circuits 59 and 60 are for detecting vibration angles in the pitch direction and yaw direction of the imaging device, respectively. Detection of vibration angles is carried out by integrating an output of, for example, an angular velocity sensor such as a vibration gyro fixed to the camera body.

The outputs of both angle detecting circuits 59 and 60, that is, information on vibration angles of the imaging device is taken into the microcomputer 53.

Pitch and yaw coil drive circuits 61 and 62 control power supply to the coils 20p and 20y comprising the pitch direction and yaw direction drive means mentioned above in response to the outputs from the angle detecting circuit 59 and 60, and shifts the shift frame 15 (shift lens L3) within the optical axis orthogonal plane.

Pitch and yaw position detecting circuits 63 and 64 include the abovementioned position detecting means and detect shift amounts of the shift frame 15 with respect to the optical axis, and outputs from these position detecting circuits 63 and 64 are taken into the microcomputer 53.

When the shift lens L3 shifts, a transmitting light flux inside the shooting lens is bent. Therefore, The shift lens L3 is shifted so that a transmitting light flux is bent, equivalent to a bending amount to be counterbalanced, in a direction of counterbalancing a displacement of a subject image on a image pickup device 51 inherently occurring due to the occurrence of vibrations in the imaging device, whereby so-called vibration correction can be carried out, by which a formed subject image does not move on the imaging pickup element 51 even if the photographic device vibrates.

Based on signals for which amplification and adequate phase compensation are carried out with respect to signals corresponding to a differential between the vibration signals of the imaging device, which are obtained from the pitch angle detecting circuit 59 and the yaw angle detecting circuit 60, and the shift amount signals obtained from the pitch position detecting circuit 63 and the yaw position detecting circuit, the microcomputer 53 causes the pitch coil drive circuit 61 and the yaw coil drive circuit 62 to drive and shift the shift frame 15.

By the control, the shift lens L3 is controlled so as to be positioned so that the differential signal mentioned above can be made smaller, and the shift lens L3 is maintained at a target position.

Furthermore, in the present embodiment, since the shift lens L3 is located at the nearer image plane side than the second group lens L2 for zooming, the amount of shift in an image with respect to the shift amount of the shift lens L3 may be varied by the position of the second group lens L2, that is, the focal length.

Therefore, the shift amount of the shift lens L3 is not directly determined based on vibration signals of the imaging device that is obtained from the pitch angle detecting circuit 59 and yaw angle detecting circuit 60, but the vibration signals are corrected based on the positional information (focal length information) of the second group lens L2. Thereby, proper vibration correcting control can be made regardless of the focal length.

An operation for correcting vibration is described above. Furthermore, the reset operation for balls 16a through 16c is carried out near or at the same time by time-sharing with the zooming and focusing reset operation when turning the power supply on (that is, before starting the vibration correcting operation), the vibration correcting operation can be carried out under rolling friction of the balls immediately after the reset operation for the balls even if the balls 16a through 16c deviate from correct positions due to impact or the like in an unused condition of the imaging device. Therefore, the device can always exhibit excellent vibration correction performance.

Conditions except for the time of use (observing subject images with a monitor or recording images into a recording device) of the photographic device are judged by the microcomputer 53 (for example, the condition where the imaging device is being carried by a user is judged by observing vibration angles of the imaging device), and the reset operation for the balls is carried out in this condition, whereby excellent vibration correction can be always guaranteed.

The correcting angle range for vibration correction is generally between 0.5 degrees and 1 degree, and in actual shooting, operations for operating functions of the imaging device and operations for searching for a subject through a finder cause movements of the imaging device exceeding the above-mentioned correcting angle range. Therefore, the photographic device may be caused to carry out the same operation as the ball reset operation depending on the movement. The vibration correction performance deteriorates in a moment due to discontinuous increases in frictional force when the balls change from a rolling frictional condition into a sliding frictional condition, however, if a movement over the correcting angle range is provided for the device, the guide is carried out by only ball rolling thereafter, so that excellent vibration correction becomes possible.

In this embodiment, a moving coil type vibration correcting device in which drive magnets are held by the device main body (shift base) and coils are held by the shift member is explained, however, the drive magnets may be held by the shift member and the coils may be held by the device main body.

Furthermore, in this embodiment, a shift unit to be used for a imaging device is explained, however, the vibration correcting device of the invention can be used for observing devices such as binoculars and telescopes.

As mentioned above, in the abovementioned embodiment, since the shift member is pressed toward the device main body side by means of magnetic attractive action between the drive magnets and yokes so that the balls are disposed and supported between the shift member and device main body, friction which becomes a load when shifting the shift member can be reduced to be only ball rolling friction. Since the rolling friction is very small in comparison with the sliding friction, even if the force for pressing the shift member in the optical axis direction (toward the device main body side) is increased, the shift member can be minutely driven and controlled. Therefore, the pressing force can be increased to a degree at which influences from unevenness in the elastic force in the optical axis direction of the flexible substrate which connects the shift member and device main body to each other can be ignored, looseness between the shift member and device main body can be securely eliminated, and excellent vibration correction performance for minute vibration correcting control can be secured.

Furthermore, if projections for causing magnetic attractive forces by the drive magnets to act are provided on the surfaces at the drive magnet sides of the yokes, attractive forces for pressing the shift member toward the device main body side act efficiently, or the shift drive force acts efficiently on the shift member.

Furthermore, if the balls are formed from a material which does not easily cause magnetic action, the balls can be prevented from being attracted by the drive magnets and detecting magnets to be used as position detecting means, and prevented from displacing by the attractive force, and device assembly efficiency can be prevented from deteriorating.

Furthermore, if the pressing force by means of magnetic attractive action between the drive magnets and yokes for the shift member toward the device main body side is set to be five times or more the weight of the shift member including the vibration correcting lens, in actual use of the vibration correcting device, influences from the elastic force in the optical axis direction caused by the flexible substrate connecting the device main body and shift member can be eliminated, and looseness between the shift member and device main body can be securely eliminated.

Moreover, if lubricating oil with viscosity which can hold the balls without relying on the pressing force caused by magnetic attractive action between the drive magnets and yokes is applied to the contact surfaces between the shift member and device main body and the balls, friction between the balls and the shift member and device main body can be further reduced, and even if a great inertia is applied to the shift member in the optical axis direction and causes the shift member to float from the balls against the magnetic attractive action, the balls can be prevented by the viscosity of the lubricating oil from easily displacing.

In addition, in a case where the end surfaces (limiting ends) for limiting the movement range of the balls in the optical axis orthogonal direction accompanying the shift movement of the shift member are provided on the device main body, even when the balls come into contact with the limiting ends, the balls can be prevented from displacing in the optical axis orthogonal direction with respect to the device main body, and thereafter, influences of displacement of the balls against the positional control (that is, vibration correcting control) of the shift member can be suppressed to be a minimum.

In a case where a pitch drive means for applying a drive force to the shift member in the pitch direction within the optical axis orthogonal plane and a yaw drive means for applying a drive force to the shift member in the yaw direction are provided on the yokes and coils, when a movement limiting portion for limiting the movement range in the direction orthogonal to the optical axis of the balls accompanying the shift movement of the shift member is provided, this movement limiting portion is formed into a rectangle shape composed of a pair of limiting ends extending in the pitch direction and a pair of limiting ends extending in the yaw direction. Then, if the distances between the pair of limiting ends of this movement limiting portion are set to be lengths resulting from summing the diameter of the balls and the maximum movement amount of the balls in response to the shift movement in the pitch direction or yaw direction of the shift member and the predetermined allowance, the area of range in the shift member and device main body with which the balls come into contact can be reduced to be a minimum, and this is advantageous for improvement in space efficiency and securing surface accuracy in the contact range.

When a pitch drive means and a yaw drive means, which are comprised of drive magnets, yokes, and coils to apply drive forces to the shift member in the pitch and yaw directions, respectively, within the optical axis orthogonal plane, are provided, and a pitch position detecting means and a yaw directional position detecting means, which detect the pitch directional position and yaw directional position, respectively, of the shift member, are provided, if the detecting directional axis of the pitch position detecting means and the detecting directional axis of the yaw position detecting means are disposed so as to be on the optical axis or in the vicinity of the optical axis of the vibration correcting lens when the shift member is at a neutral position in the pitch direction and yaw direction, even if the shift member slightly rotates about the optical axis of the vibration correcting lens during shifting, the rotation can be prevented from influencing the detection results of the position detecting means to a level which comes into problem in terms of positional control of the shift member, whereby positional control (that is, vibration correcting control) of the shift member can be made with high accuracy by simple construction.

In a case where the position detecting means for detecting the position of the shift member within the optical axis orthogonal plane are comprised of detecting magnets which are two-pole magnetized and held by the shift member and elements for detecting changes in magnetic flux density due to movements of these detecting magnets, a magnetic flux from the detecting magnets are made to pass through the yokes held by the shift member, that is, the yokes to be used as the shift member drive means are also used for positional detection, whereby the number of parts can be reduced and the device can be downsized in comparison with the case where yokes exclusive to positional detection are provided, and vibration correcting control performance can be improved by reducing the weight of the shift member.

In the abovementioned embodiment, a movement limiting portion is provided for limiting the movable range of the balls on the device main body, and before starting the vibration correcting operation, the shift member is moved and shifted by a maximum movable amount so that the balls are positioned within an initial positioning range in the vicinity of the center of the movement limiting portion with respect to the shift member and device main body. Therefore, at the point of starting the vibration correcting operation, the balls can be securely positioned within the initial positioning range, and even if the shift member moves by a maximum movable amount during the vibration correcting operation, limitation of rolling movements of the balls by the movement limiting portion and occurring of sliding friction between the balls and shift member can be prevented. Therefore, the frictional force to act on the shift member during vibration correction can be limited to only the rolling friction between the shift member and balls, whereby vibration correcting control can be made with high accuracy.

What is claimed is:

1. A lens device comprising:
a vibration correcting lens;
a shift frame which holds the vibration correcting lens and is movable in a direction orthogonal to an optical axis of the lens device;
a shift base which is adapted to prevent the shift frame from moving in the optical axis direction;
a ball which is disposed and supported between the shift frame and the shift base and is relatively movable with respect to each of the shift frame and the shift base;
a limiting portion which is provided so as to limit a movable range of a relative movement of the ball; and
a drive unit which (a) has a magnet, a yoke, and a coil and (b) drives the shift frame in a direction orthogonal to the optical axis by applying electrical current to the coil, the magnet being held by one of the shift frame and the shift base, and the yoke and the coil being held by another of the shift frame and the shift base,
wherein the size of the movable range of the limiting portion in a driving direction of the shift frame is set so that the ball does not contact the limiting portion even when the ball rolls from a center of the movable range by half of a maximum movement amount of the shift frame, and the maximum movement amount is (a) a maximum movement amount when the shift frame is mechanically moved or (b) a maximum movement amount when the shift frame is moved to correct an image vibration, and
wherein the shift frame is biased toward the shift base using a magnetic attractive force in the optical axis direction occurring between the magnet and the yoke.

2. The lens device according to claim 1, wherein a force for biasing the shift frame toward the shift base is five times or more a weight of the shift frame including the vibration correcting lens.

3. An image taking apparatus comprising the lens device according to claim 1.

4. An observation apparatus comprising the lens device according to claim 1.

5. A lens device comprising:
a vibration correcting lens;
a shift frame which holds the vibration correcting lens and is movable in a direction orthogonal to an optical axis of the lens device;
a shift base which is adapted to prevent the shift frame from moving in the optical axis direction;
a ball which contacts the shift frame and the shift base and can roll between the shift frame and the shift base;
a surface which defines a movable range of the ball by contacting the ball; and
a drive unit which (a) has a magnet, a yoke and a coil and (b) drives the shift frame in the direction orthogonal to the optical axis by applying electrical current to the coil, the magnet having two magnetizing poles and being held by one of the shift frame and the shift base, and the yoke and the coil being held by another of the shift frame and the shift base,
wherein the shift frame is biased toward the shift base using a magnetic attractive force in the optical axis direction occurring between the magnet and the yoke,
wherein the yoke has a projection which extends toward the magnet, and
wherein, both when a center of the vibration correcting lens coincides with the optical axis and when the shift frame moves a maximum movement amount to correct an image vibration, a center of the projection is positioned at a boundary between the two magnetizing poles of the magnet in the direction which the shift frame is driven.

6. The lens device according to claim 5, wherein the coil is arranged along an outer circumference of the projection between the magnet and the yoke.

7. The lens device according to claim 5, wherein a force for biasing the shift frame toward the shift base is five times or more a weight of the shift frame including the vibration correcting lens.

8. An image taking apparatus comprising the lens device according to claim 5.

9. An observation apparatus comprising the lens device according to claim 5.

* * * * *